Aug. 31, 1948.　　　　F. G. ZAGAR　　　　2,448,342
BROACH HOLDER

Filed Dec. 11, 1944　　　　2 Sheets-Sheet 1

INVENTOR
Frank G. Zagar
BY
Evans & McCoy
ATTORNEYS

Aug. 31, 1948.   F. G. ZAGAR   2,448,342
BROACH HOLDER

Filed Dec. 11, 1944   2 Sheets-Sheet 2

INVENTOR
Frank G. Zagar
BY Evans + McCoy
ATTORNEYS

Patented Aug. 31, 1948

2,448,342

UNITED STATES PATENT OFFICE 2,448,342

BROACH HOLDER

Frank G. Zagar, Euclid, Ohio

Application December 11, 1944, Serial No. 567,719

4 Claims. (Cl. 279—35)

This invention relates to holders for broaches or similar tools and has for its object to provide a chuck or holder of simple construction that is quickly and easily operable to clamp or release a tool shank.

Further objects of the invention are to provide a lever operated clamp that can be operated to instantaneously release a broach or other tool and to provide a holder having pivoted jaws provided with engaging faces that are shaped to conform to the shank of a broach or other tool.

With the above and other objects in view the invention may be said to comprise a broach holder as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which Fig. 1 is a side elevation of a holder embodying the invention, with a portion of the holding jaws broken away and shown in section;

Figure 1:
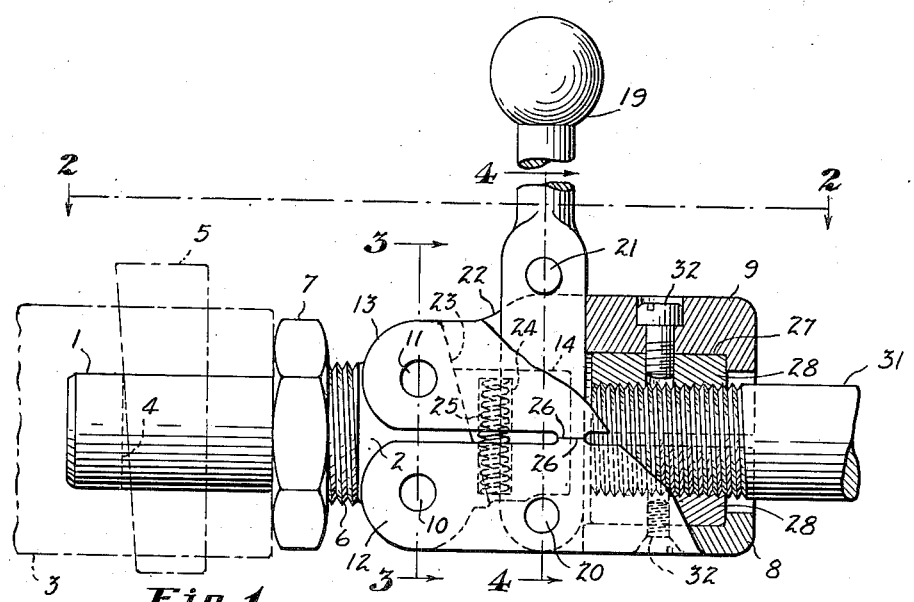
Figure 2:
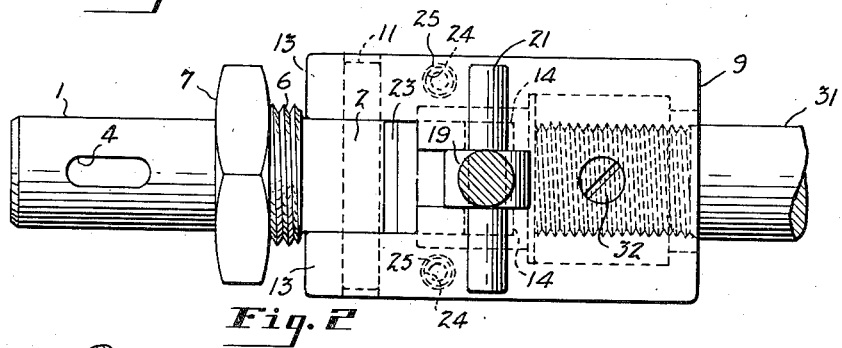
Fig. 2 is a section taken on the line indicated at 2—2 in Fig. 1.
Figures 3, 4:
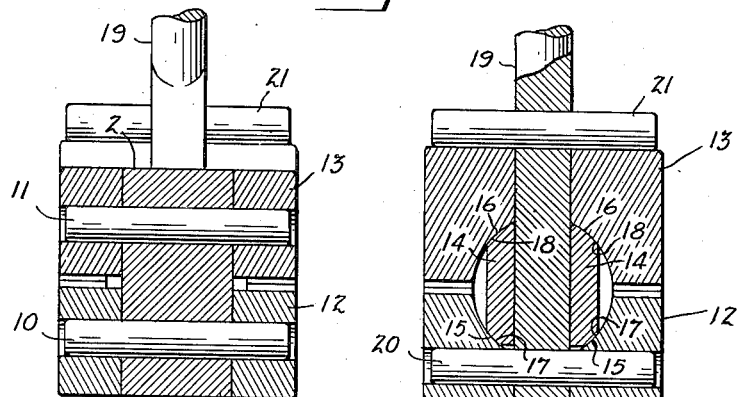
Fig. 3 is a section taken on the line indicated at 3—3 in Fig. 1.
Fig. 4 is a section taken on the line indicated at 4—4 in Fig. 1.

In the accompanying drawings the invention is shown applied to a broach holder which has an attaching portion 1 with a jaw supporting head 2 at its outer end. The attaching portion 1 fits in a socket formed in a tool carrier 3, which may be the reciprocating head of a broaching machine, and is provided with a transverse slot 4 which receives a tapered coupling pin 5. Adjacent the head the attaching portion 1 has a screw thread 6 which receives a nut 7 by means of which the attaching portion 1 may be drawn tightly against the coupling pin 5.

A pair of holding jaws 8 and 9 are connected to the head 2 by transverse hinge pins 10 and 11 that form parallel pivots at right angles to the central axis of the attaching portion, the pins 10 and 11 being disposed on opposite sides of said central axis and at equal distances therefrom. The jaw 8 is slotted to provide parallel arms 12 that straddle the head 2 and receive the pivot pin 10. The jaw 9 has similar arms 13 that straddle the head 2 and receive the pivot pin 11.

The head 2 is slotted at its outer end to provide a pair of forwardly extending arms 14 and these arms have arcuate edges 15 and 16 that are engaged by correspondingly curved shoulders 17 and 18 on the inner sides of the arms 12 and 13 to limit the closing movements of the jaws. A lever 19 fits between and is guided by the arms 14 of the head 2 and between the portions of the arms 12 and 13 that overlie the arms 14, the inner end of the lever 19 being connected to the arms 12 by a pivot 20. The lever 19 carries a transverse pin 21 that overlies and engages longitudinal cam surfaces 22 formed on the outer edges of the arms 13 of the jaw 9. The lever 19 is movable from a jaw releasing position shown in Fig. 5 to a jaw clamping position as shown in Fig. 1, the inward releasing movement of the lever 19 being limited by an inclined face 23 formed on the head 2 and the outward jaw closing movement of the lever being limited by the body of the jaw 9 at the outer end of the slot between the arms 13.

Figure 5:
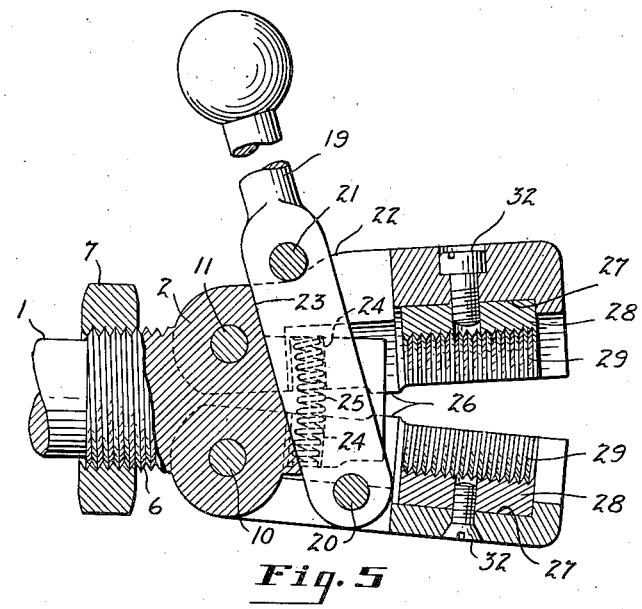
Fig. 5 is a longitudinal section through the holder showing the jaws in open position.

The arms 12 and 13 of the jaws 8 and 9 are provided with drilled holes 24 opening to their inner edges which are in axial alinement when the jaws are closed. The holes 24 form pockets to receive coil springs 25 which are compressed when the jaws are closed. The springs 25 hold the jaws open when the lever 19 is swung inwardly as shown in Fig. 5 and the jaws are locked by the lever against the edges 15 and 16 of the arms 18 of the head 2 which limit the closing movement of the jaws. The jaws may also be provided with stop lugs 26 on their inner faces which contact when the jaws are in closed position. Outwardly of the slots 17 and 18 the jaws 8 and 9 are provided with recesses 27 on their inner faces which are adapted to receive semi-circular pads 28 that have internal threaded faces 29 that conform to the threaded end of a broach 31. The pads 28 are adapted to be replaced with other pads shaped to conform to tool shanks of different sizes and different configurations, the pads 28 being detachably held in place in recesses 27 by means of screws 32.

Figure 6:
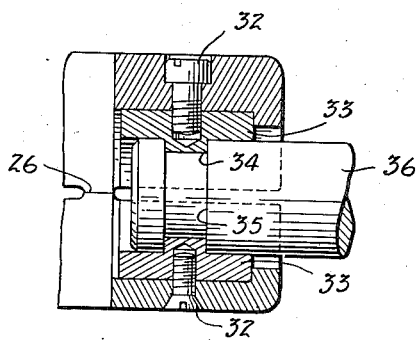
Fig. 6 is a sectional detail view showing pads formed to fit a circumferentially grooved tool shank.
Figure 7:
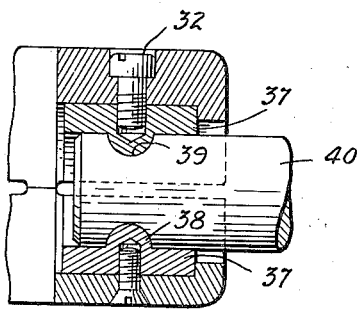
Fig. 7 is a sectional view similar to Fig. 6 showing pads shaped to conform to a transversely grooved tool shank.

In Figs. 6 and 7 of the drawings other forms of pads which may be used are shown. In Fig. 6 pads 33 have central ribs 34 which conform to a circumferential groove 35 in a tool shank 36. In Fig. 7 pads 37 have transverse ribs 38 that fit in transverse grooves 39 formed in a tool shank 40.

When the lever 19 is in the position shown in Fig. 5, the springs 25 hold the jaws 8 and 9 far enough apart to allow insertion of the tool shank which is clamped by moving the lever to the position shown in Fig. 1. When it is desired to release the tool the lever is shifted to the position shown in Fig. 5 and the jaws are instantly opened by the springs 25.

It is to be understood that variations and modifications of the specific device herein shown and described for purposes of illustration, may be made without departing from the spirit of the invention.

What I claim is:

1. A broach holder comprising a body having an attaching portion, a head at one end of the attaching portion, a pair of holding jaws, pivots connecting the jaws to the head, said pivots being transverse to the central axis of the body and on opposite sides thereof, said jaws having alined centrally disposed longitudinal slots disposed transversely of and outwardly of said pivots, a lever extending through the slot of one jaw with its inner end in the slot of the other jaw, a pivot connecting the lever to the latter jaw, and a transverse pin carried by the lever and engaging the outer face of the jaw through which its extends.

2. A broach holder comprising a body having an attaching portion with an enlarged head at one end, a pair of holding jaws, pivots connecting the inner ends of said jaws to the head, said pivots being at right angles to the central axis of the body and at equal distances therefrom on opposite sides thereof, said jaws having registering slots transversely of the pivots and outwardly thereof, one of said jaws having a longitudinally extending cam surface on its outer face alongside its slot, a spring exerting a spreading pressure on the jaws, a jaw actuating lever extending through the slot in the first mentioned jaw into the slot of the other jaw and pivoted to the latter jaw, a pin carried by the lever and engageable with said cam surface, and opposed pads carried by the outer end portions of the jaws outwardly of said slots and having inner faces that conform to the shank of a broach.

3. A broach holder comprising a body having an attaching portion and a head having an axially projecting positioning member that is provided with a longitudinal slot, a pair of holding jaws pivoted at their inner ends to said head, said jaws being disposed on opposite sides of said positioning member and movable into and out of engagement with said member, said jaws having slots that register with the slot of the positioning member, a lever extending through the slot of one of said jaws, the slot of said positioning member and into the slot of the other jaw, a pivot connecting the lever to the latter jaw, and a member carried by the lever and engaging the outer face of the jaw through which the lever extends.

4. A broach holder comprising a body having an attaching portion and a head having an axially projecting positioning member that is provided with a longitudinal slot, a pair of holding jaws having inner end portions straddling said head and positioning member and pivoted to said head, the closing movements of said jaws being limited by said positioning member, said jaws having slots registering with the slot in the positioning member, a spring acting on said jaws to move them apart, a lever fitting in said slots, said lever being pivoted to one jaw and extending through the positioning member and the other jaw, a member carried by said lever and engageable with the outer face of the latter jaw to move the jaws together in opposition to said spring.

FRANK G. ZAGAR.

REFERENCES CITED

The following references are of record in the file of this patent:

UNITED STATES PATENTS

| Number | Name | Date |
|---|---|---|
| 103,642 | Mingus | May 31, 1870 |
| 116,649 | Wagner | July 4, 1871 |
| 232,655 | Shaw | Sept. 28, 1880 |
| 2,046,052 | Bechler | June 30, 1936 |